United States Patent [19]

Knechtel

[11] 4,098,914
[45] Jul. 4, 1978

[54] PEANUT BRITTLE MANUFACTURE

[76] Inventor: Herbert B. Knechtel, 2600 Windsor Mall, Park Ridge, Ill. 60068

[21] Appl. No.: 710,434

[22] Filed: Aug. 2, 1976

[51] Int. Cl.² .............................................. A23G 3/00
[52] U.S. Cl. ..................................... 426/632; 426/660
[58] Field of Search ................ 426/632, 660, 629, 93, 426/625, 518, 517

[56] References Cited

U.S. PATENT DOCUMENTS

| | | | |
|---|---|---|---|
| 1,606,950 | 11/1926 | Long | 426/660 |
| 3,009,427 | 11/1961 | Bell | 426/632 |
| 3,950,567 | 4/1976 | Tomlinson | 426/660 |

*Primary Examiner*—Hiram H. Bernstein
*Attorney, Agent, or Firm*—Darbo & Vandenburgh

[57] ABSTRACT

Comminuted popped popcorn is added to the precursor mix of peanut brittle. This precursor mix is prepared in batches or in a continuous mixer. A sheeter forms a continuous ribbon of the precursor mix on a first belt conveyor where it is partially cooled. The ribbon moves about the end of that conveyor to invert it and thence onto a second belt conveyor moving in the opposite direction. At the end of the second belt conveyor the ribbon moves onto a third belt conveyor moving at a substantially greater speed than the second belt conveyor. The change in speed of the ribbon as it moves from the second to the third belt conveyor stretches the ribbon. After hardening on the third conveyor the ribbon of peanut brittle is broken by contact with a plurality of spikes projecting from a rotating drum.

3 Claims, 2 Drawing Figures

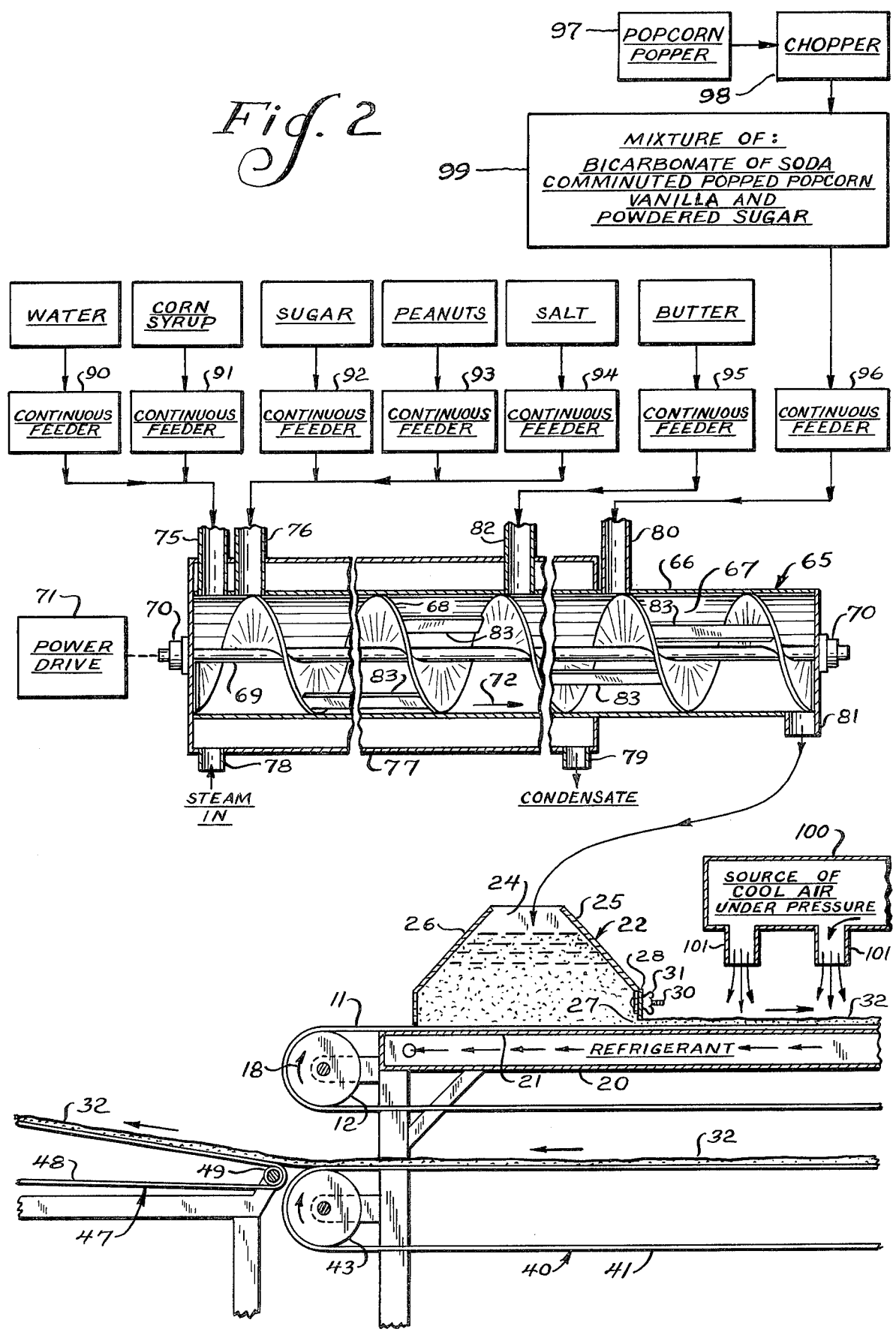

PEANUT BRITTLE MANUFACTURE

BACKGROUND AND SUMMARY OF THE INVENTION

So far as I am aware, the peanut brittle being made commercially today is produced much in the same manner as it has been for many years. That is, the normal ingredients for the precursor mix of peanut brittle, such as peanuts, sugar, corn syrup, butter, etc., are mixed and cooked to a golden brown to produce a heated mixture of peanuts in what may be referred to as a caramel. Upon the completion of the cooking, but with continued mixing, bicarbonate of soda is added and almost immediately the mixture is then spread out on an oiled, cool surface such as a slab of marble, a sheet of stainless steel, etc. This spreading out of the mixture is basically a manual operation. It must be performed very rapidly since the heat of the mixture (e.g., 300° F., 148.89° C.) at the time the bicarbonate of soda is added will burn the bicarbonate of soda unless there is the prompt cooling of the mixture achieved by spreading it out in the form of a thin sheet on a cool surface. The burning of the bicarbonate of soda is exhibited by a blackening of the mixture and a resultant smoking. This results in an undesirable product. After the temperature of the sheet of mix is substantially reduced and rather uniform, but before the caramel hardens, the sheet is stretched, again conventionally a hand operation. For a further description of manufacture see pages 544–546 of CANDY PRODUCTION, by Walter L. Richmond, published by The Manufacturing Confectioner (1948).

Because the product must be sheeted promptly after the bicarbonate of soda is added and because it is a thick, tacky mixture, a precursor mix prepared in the above manner is not very suitable for sheeting by mechanical equipment as distinguished from a hand operation.

The principal object of the present invention is to mechanize the manufacture of peanut brittle. To this end, I have not only devised apparatus for performing the various operations conventionally performed by hand, but I have also devised a precursor mix which reduces the tendency of the bicarbonate of soda to burn (i.e., more time is available after the bicarbonate of soda is added and before the sheet is formed) and the plasticity of the mix is increased without impairing the desirable characteristics of the finished peanut brittle. The precursor mix prepared in accordance with my invention results in a peanut brittle which by normal observation is indistinguishable from conventional peanut brittle except that it has the desirable characteristic of being more tender to the bite when it is eaten. It is also more shatter resistant, i.e., does not tend to produce fines, as compared to conventional peanut brittle. While not having a noticeably different flavor, the flavor of the resultant product is enhanced.

The precursor mix of my invention corresponds to the conventional mix except that it includes, in addition to the ingredients of the conventional mix, between about three-tenths of one percent and about two percent (by weight) of comminuted popped popcorn. The popcorn should be comminuted to an extent that substantially all (97% or 98%) will pass through a No. 1 mesh screen. With large pieces of popcorn and/or excessive quantities of popcorn included in the mix the resulting peanut brittle does not have the important characteristic of appearing to correspond to conventional peanut brittle. Furthermore, a corresponding amount by weight of large pieces of popcorn will not obtain as intimate a contact with the mix and thus will not have the cooling effect to ameliorate burning and improve flowability for sheeting purposes.

A principal object of the apparatus of the present invention is simplicity. In the main, it may be constructed using readily available components. It can be easily cleaned and maintained in a sanitary condition. Prototype operations have demonstrated that it satisfactorily performs all of the conventionally manual operations in producing peanut brittle. It results in substantial monetary savings in the manufacture of peanut brittle as compared to a manual process.

Further objects and advantages will become apparent from the following description of the drawings.

DESCRIPTION OF THE DRAWINGS

FIG. 2 is a section taken at line 2—2 of FIG. 1 and illustrates several alternatives in the apparatus of the present invention.

DESCRIPTION OF SPECIFIC EMBODIMENTS

Figure 1:
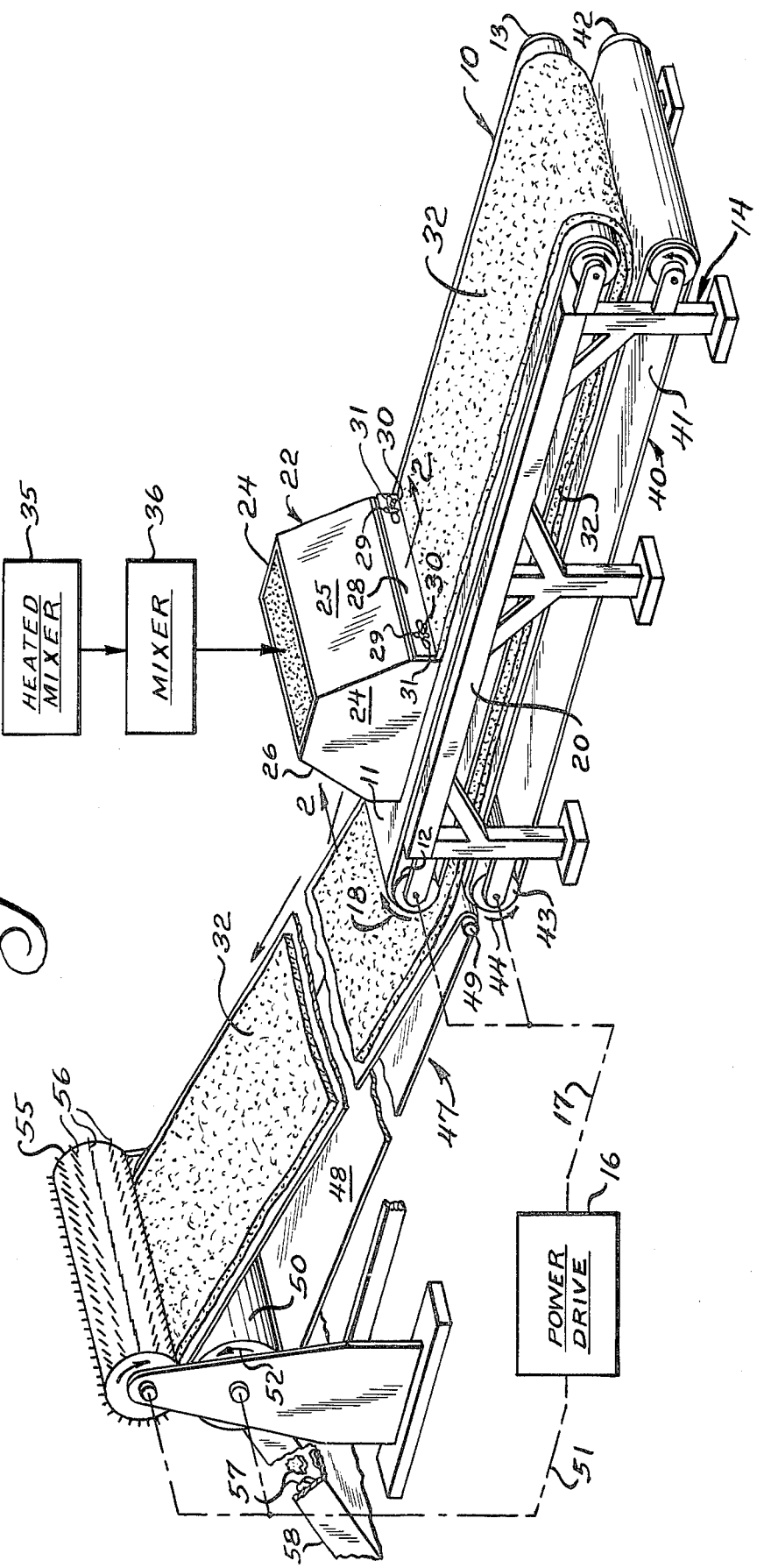
FIG. 1 is an isometric view, partially diagrammatic, of an embodiment of the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the present invention a precursor mix for the peanut brittle is prepared utilizing a conventional batch of ingredients plus the addition of about three-tenths of one percent to about two percent of comminuted popped popcorn having a size sufficiently small to pass through a No. 1 mesh screen (U.S.A. standard mesh screen sizes). This popcorn is comminuted by chopping. In theory there would be substantially no limit as to how fine the popcorn might be, but as a practical matter there is no necessity of going to the added effort of having it exceedingly fine. In test operations the chopping produced popcorn particles that varied in size such that about 42 percent was retained on a No. 4 screen; about 21 percent went through the No. 4 screen and was retained on a No. 5 screen; about ten percent went through the No. 4 and No. 5 screens and was retained on a No. 6 screen; about twelve percent went through the 4–6 screens and was retained on a No. 8 screen; about 8 percent went through the 4–8 screens and was retained on a No. 14 screen; and about six percent went through all of the foregoing screens (making a total of one hundred percent). While it is not practical to obtain complete uniformity in the chopped popcorn particles, an advantageous size would be that which would pass through a No. 3 screen and be retained on a No. 4 screen.

This precursor mix may be cooked and mixed in a conventional manner, which is to cook and mix the ingredients other than the bicarbonate of soda with agitation until the mix reaches about 300° F (148.89° C.). Thereupon further heating is discontinued and bicarbonate of soda is added to the mix in the conventional practice. In the present invention the comminuted popcorn is added no later than immediately after the addition of the soda and is most effective to prevent the burning of the soda if it is added at the same time that the soda is added. In fact, I prefer to premix the soda with the comminuted popcorn so that they are put into the hot precursor mix simultaneously. After brief additional agitation the mix is promptly sheeted on a cool surface. As soon as a bottom crust has formed the sheet is turned over and thereafter is stretched when the temperature has reached a manageable range.

While different manufactures will employ different specific formulations, the following is a specific example of a formulation utilized in carrying out the present invention:

- 20 lbs. (9.07 kg.) refined cane sugar
- 15 lbs. (6.80 kg.) 42 D.E. corn syrup
- 25 lbs. (11.34 kg.) No. 1 Spanish peanuts
- 8 lbs. (3.63 kg.) water
- 7½ lbs. (3.40 kg.) high-score dairy butter
- 6 ozs. (170.1 g.) bicarbonate of soda
- 10 ozs. (283.5 g.) salt
- 16 ozs. (453.6 g.) powdered sugar
- 10 ozs. (283.5 g.) chopped popped corn
- 1½ ozs. (44.3 ml.) double strength pure vanilla The sugar, corn syrup, water, salt and peanuts are put in a steam heated, stainless steel kettle equipped with a stirring mechanism and cooked (while mixing) until the mix reaches a temperature of 275° F. (135° C.). The butter is then added and the cooking and stirring is continued until the mix reaches 300° F. (148.89° C.). Further heating is discontinued (e.g., by transfer to an unheated mixer). A previously prepared mix of the bicarbonate of soda, the comminuted popped popcorn, the powdered sugar and vanilla is then added and the mixing continued for 30 seconds. This precursor mix is then sheeted as promptly as possible. With the addition of the comminuted popped popcorn there is a period of about three minutes available within which to accomplish the sheeting before deterioration of the bicarbonate of soda becomes apparent. This period of time is much longer than is the case when comminuted popped popcorn is not included in the precursor mix. After sheeting the conventional steps of inversion and stretching may be followed. As previously mentioned, the addition of the comminuted popped popcorn also increases the plasticity of the precursor mix which enables the use of mechanical apparatus for sheeting the mix.

Such as apparatus now will be described in connection with the illustration of FIG. 1. This apparatus comprises a first conveyor, generally 10. This includes an endless belt 11 trained for movement about a pair of rollers 12 and 13 suitably journaled in a main frame, generally 14. A power drive 16 is suitably connected to roller 12 as indicated by dot-dash lines 17 to rotate roller 12 in the direction indicated by arrow 18. Thus the top run of belt 11, which run defines a part of the conveying path, is moved from left to right as pictured in the drawing. Belt 11 (and the other belts subsequently discussed) is a solid ribbon of polyurethane sufficiently thick to stand the service requirements.

Belt 11 is cooled by a refrigeration chamber 20 forming a part of frame 14. As best seen in FIG. 2, the belt rides on a top wall 21 of this refrigeration chamber. A coolant or refrigerant is passed through the chamber from a suitable source, not shown. Wall 21 also serves to support the belt, particularly in the area of the sheeter, generally 22.

The sheeter 22 comprises two end walls 24 and front and back walls 25 and 26. Front and back walls 25 and 26 are farther apart at the bottom than at the top. Thus the volume at the top, at which point the hot mix is initially received, is the smallest and the volume at the bottom, at which the mix is in contact with the cooled belt 11, is relatively large. The bottoms of walls 24 and 26 are substantially at the level of the top of belt 11. The bottom of wall 25 is spaced above the top of the belt defining an opening 27. Extending across the front of this opening is a doctor blade 28, which controls the effective height of the discharge opening through which the ribbon or sheet of mix is discharged onto belt 11. This blade has vertical slots 29 through which bolts 30 extend. These bolts are secured to wall 25 and have thumbscrews 31 releasably affixing the doctor blade in place. Thus by loosening the thumbscrews the doctor blade may be raised or lowered with respect to belt 11 to establish the desired thickness of the ribbon or sheet 32 which is discharged from sheet 22 onto belt 11.

The initial part of the ingredients of the precursor mix are mixed and cooked in a heated mixer 35. Upon reaching the 300° F. temperature they are transferred, as by gravity, to an unheated mixer 36. It is in mixer 36 that the bicarbonate of soda, comminuted popped popcorn, etc., are added and agitated for about 30 seconds. Thereafter the precursor mix is transferred, as by gravity, into sheeter 22. Mixer 35 may be a steam jacketed, stainless steel kettle having a mixer or agitator. See, for example, U.S. Pat. No. 3,752,057. Mixer 36 would be a corresponding unit, except without the steam jacket. Using such kettles, the mixing operation is a batch process. Such a process is feasible since the sheeter 22 does not require continuous filling, but has a reserve capacity. A continuous mixer will subsequently be described in connection with FIG. 2.

Below the first conveyor 10 is a second conveyor, generally 40. It comprises an endless belt 41 trained for movement about a pair of rollers 42 and 43. Roller 43 is connected to drive 16 as illustrated by dot-dash lines 17 so that it rotates in the direction indicated by arrow 44. Thus while belt 11 moves left to right while conveying the ribbon 32, belt 41 moves from right to left while conveying the ribbon (i.e., the top run of the belt defines part of the conveying path for the ribbon). Belt 41 moves at substantially the same speed as belt 11, perhaps just slightly faster so that there is no opportunity for the ribbon 32 to pile up as it proceeds from belt 11 to belt 41.

Roller 13 represents the discharge end of conveyor 10 and roller 42 represents the starting end of conveyor 40. As the ribbon 32 moves off the discharge end of conveyor 10 it is turned over, i.e., it rotates one hundred and eighty degrees about an axis which may be thought of as being represented by the shaft of roller 13. This path of rotation is not exactly circular. This rotation causes the top surface of the ribbon 32 as it existed on belt 11 to be the bottom surface in contact with belt 41 as the ribbon is deposited on the latter belt. Normally additional refrigeration will not be required while the ribbon is on belt 41, but some additional refrigeration could be employed. While on belt 11 the lower surface of the ribbon reached a substantially lower temperature than the top surface. While on belt 41 the temperature of the ribbon will substantially equilibrate throughout the thickness of the ribbon.

Beyond the end of conveyor 40, the end being represented by roller 43, is a third conveyor, generally 47. It comprises a belt 48 trained for movement about a pair of rollers 49 and 50. Roller 50 is connected to drive 16 as indicated by dot-dash line 51 so that the roller turns in the direction indicated by arrow 52. Thus upon leaving the discharge end of conveyor 40 the ribbon 32 is received on the entering end of conveyor 47, as represented by roller 49, and moves along that part of the conveying path represented by the top run of belt 48.

The speed of lineal movement of belt 48 is substantially greater than the speed of lineal movement of belt 41, e.g., it is running about twice as fast. Thus the ribbon 32 on belt 48 is likewise moving about twice as fast as is the ribbon on belt 41. This results in a stretching of the ribbon primarily between the time that the ribbon is discharged from conveyor 40 and received on conveyor 47. At the time of stretching the temperature of the ribbon will be about 160° F. (71.1° C.).

The speed differential between conveyors 40 and 47 will vary with the desires of the particular manufacturer for the product he wishes to produce. Increasing the speed differential causes the caramel portion of the peanut brittle to become thinner. Conversely, the caramel portion is thicker as the speed differential is reduced. In a prototype machine belt 11 moved at a speed of seven feet per minute; belt 41 moved at a speed of 7 and one-half feet per minute; and belt 48 moved at a speed of fourteen feet per minute. The characteristics of the resulting product (which used the formulation of the precursor mix as described in the foregoing specific example) were excellent.

The ribbon remains on conveyor 47 (which actually could be a series of separate conveyors) until the caramel portion had hardened, i.e., is about room temperature. At that time it is passed under a roller 55 having a plurality of projecting spikes 56. This roller is power driven from drive 16, but could be undriven, freely rotatable. As the ribbon passes under the roller 50 (which represents the end of the conveying path for the ribbon) with spikes 56 press down on the ribbon causing a fracturing of the ribbon so that it is broken up into individual pieces 57 of peanut brittle. These are then transported to a packaging station, not shown, as by means of a gravity conveyor 58.

FIG. 2 illustrates, in longitudinal section, a continuous mixer, generally 65, for the precursor mix. It comprises a cylindrical shell 66 defining a mixing chamber 67 which may be suitably vented. A screw or helical conveyor 58 is mounted in the mixing chamber. The shaft 69 of the screw is journaled in bearings 70 and is suitably connected to a power drive 71 to rotate the screw in a direction such that the product in the chamber moves in the direction indicated by arrow 72.

Communicating with the chamber is a conduit 75 to receive the liquid components of the initial part of the precursor mix and a conduit 76 to receive the dry components of that initial part. About the upstream part of the shell 66 is a steam jacket 77. Steam is introduced into the jacket through a conduit 78 and condensate is discharged therefrom through a conduit 79. Downstream of the jacketed portion of shell 66 is a conduit 80 through which the final part of the precursor mix ingredients are introduced into chamber 67. The precursor mix is discharged from chamber 67 through a conduit 81 to flow into the sheeter 22. While some manufacturers may desire to introduce the butter initially as a part of the original ingredients, I prefer that it be introduced near the end of the heating. Thus, there is a conduit 82 positioned downstream of the initial part of chamber 67 through which to introduce the butter. The screw 68 has a plurality of scrapers 83 extending between adjacent flights thereof. These serve as agitators to promote the mixing of the ingredients in the mixing chamber.

Continuous feeders, e.g., gear pumps 90 and 91, continuously meter the desired amount of water and corn syrup respectively into the upstream end of chamber 67 through conduit 75. Similarly, feeders 92-94 simultaneously introduce the sugar, peanuts and salt. These are cooked by the heated wall 66 and mixed by the screw conveyor and scrapers. At the same time the conveyor moves the mix in the direction indicated by arrow 72. By the time that mix reaches the area of conduit 82 it is about 275° F. and butter is thereupon metered in by feeder 95. Upon reaching the end of the jacketed part of shell 66 the temperature of the mix will have achieved 300° F. At that time the mixture of bicarbonate of soda, comminuted popped popcorn, vanilla and powdered sugar is metered into the chamber by feeder 96. Mixing then continues while the precursor mix moves from the area of conduit 80 to the discharge conduit 81. The popcorn will have been produced in a popper 97 and chopped in a chopper 98 before being added to the supply bin 99.

One advantage of the continuous mixer is that it is not necessary to maintain a significant quantity of precursor mix in the sheeter as is required when batch mixing is employed. This reduces the delay time between the adding of the bicarbonate of soda and the sheeting of the mix into a ribbon and thus when the effective cooling of the mix commences. Thus, there is less problem so far as the burning of the soda is concerned. In that event it is possible, if desired, to add the chopped popped popcorn to the mix prior to the time that the soda is added since there is not the necessity for using the popcorn to provide cooling to protect the soda against such deterioration.

In some embodiments the upper surface of the ribbon 32 is cooled by refrigerated air simultaneously with the cooling of the lower surface by refrigerated chamber 20. When this is done there is a plenum 100 positioned above the upper run of belt 11. This plenum has a plurality of nozzles 101 through which the cool air is directed down onto the upper surface of the ribbon 32. Alternatively, the ribbon may be transported through a chamber having refrigerated air therein. This cooling the upper surface of the ribbon as well as the lower surface can eliminate the necessity for inverting the ribbon. However, the temperature of the ribbon should be allowed to equilibrate after the cooling takes place and before the ribbon is stretched. Such equilibration can take place while the ribbon is moving on a belt, such as 41, during a time at which there is no special provision for cooling beyond that provided by the ambient conditions in the manufacturing plant.

The additional plasticity of the precursor mix provided by the addition of the comminuted popped popcorn enables a manufacturer to utilize more peanuts in the peanut brittle than is normally the case. With a conventional precursor mix, the manufacturer is limited to a peanut content of about twenty percent by weight of the total mix. Going much above this amount results in such a stiff product that it cannot be sheeted within the time available before there is a burning of the bicarbonate of soda. In the specific example of the present invention hereinbefore given the peanut content is about thirty-two percent. This could be increased substantially when the present invention is employed.

The foregoing description exclusively discusses peanut brittle because peanut brittle constitutes a very high percentage of the volume of nut brittles that are manufactured. To a very limited extent there are other nut brittles manufactured wherein other nuts, e.g., cashews, are substituted for peanuts in whole or in part. Also a brittle is sometimes made in which coconut meat is substituted for the peanuts. The present invention would be equally applicable to such other brittles and the term "nut brittle" as used herein means peanut brittle and other brittles having such nut, including coconut, substitutes for peanuts.

I claim:

1. A method of making a nut brittle such as peanut brittle which comprises the step of, prior to the sheeting of the precursor mix for the nut brittle, adding to the usual ingredients including bicarbonate of soda for said mix an amount of comminuted popped popcorn which amount is within the range of about three-tenths of one percent to about two percent by weight of the total ingredients of said mix and which has a size sufficiently small to pass through a No. 1 mesh screen to thereby ameliorate the tendency of the bicarbonate of soda in said mix to burn, to facilitate the sheeting of the mix and to make the resulting nut brittle more tender to the bite while still retaining the recognized characteristics of nut brittle.

2. A precursor mix for the making of nut brittle such as peanut brittle which mix, comprising the usual ingredients for nut brittle including bicarbonate of soda, is sheeted, cooled and stretched to form the nut brittle, said precursor mix being characterized by including:

an amount of comminuted popped popcorn which amount is within the range of about three-tenths of one percent to about two percent by weight of the total ingredients of said mix and which has a size sufficiently small to pass through a No. 1 mesh screen, said mix being characterized by less tendency of the bicarbonate of soda in said mix to burn as compared to conventional mix, increased plasticity as compared to conventional mix and results in a nut brittle more tender to the bite while still retaining the characteristics of nut brittle.

3. Nut brittle which includes, in addition to the usual constituents thereof, including bicarbonate of soda, an amount of comminuted popped popcorn which amount is within the range of about three-tenths of one percent to about two percent by weight of the total constituents thereof and which has a size sufficiently small to pass through a No. 1 mesh screen and is characterized by being more tender to the bite while still retaining the characteristics of nut brittle.

* * * * *